US010844177B2

(12) United States Patent
Baily et al.

(10) Patent No.: US 10,844,177 B2
(45) Date of Patent: *Nov. 24, 2020

(54) ELASTOMERIC COMPOSITIONS AND THEIR APPLICATIONS

(71) Applicant: Dow Silicones Corporation, Midland, MI (US)

(72) Inventors: Victor Baily, Seneffe (BE); Gregory Chambard, Seneffe (BE); Frederic Gubbels, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/322,639

(22) PCT Filed: Aug. 3, 2017

(86) PCT No.: PCT/EP2017/069744
§ 371 (c)(1),
(2) Date: Feb. 1, 2019

(87) PCT Pub. No.: WO2018/024857
PCT Pub. Date: Feb. 8, 2018

(65) Prior Publication Data
US 2019/0177486 A1    Jun. 13, 2019

(30) Foreign Application Priority Data

Aug. 3, 2016 (GB) .................................. 1613412.4

(51) Int. Cl.
| | | |
|---|---|---|
| *C08G 77/18* | (2006.01) | |
| *C08K 5/56* | (2006.01) | |
| *C08L 83/04* | (2006.01) | |
| *C08K 5/57* | (2006.01) | |
| *C08L 83/00* | (2006.01) | |
| *C08K 3/04* | (2006.01) | |
| *B29C 73/16* | (2006.01) | |
| *C08G 77/08* | (2006.01) | |
| *C09K 3/10* | (2006.01) | |
| *C08G 77/16* | (2006.01) | |

(52) U.S. Cl.
CPC ............ *C08G 77/18* (2013.01); *B29C 73/163* (2013.01); *C08G 77/08* (2013.01); *C08K 3/04* (2013.01); *C08K 3/041* (2017.05); *C08K 5/56* (2013.01); *C08K 5/57* (2013.01); *C08L 83/00* (2013.01); *C08L 83/04* (2013.01); *C09K 3/1018* (2013.01); *C08G 77/16* (2013.01); *C09K 2200/0685* (2013.01)

(58) Field of Classification Search
CPC . C08K 5/56; C08K 3/04; C08K 3/041; C08K 5/57; C09K 3/1018; C09K 2200/0685; C08G 77/08; C08G 77/18; C08G 77/16; C08L 83/04; C08L 83/00; B29C 73/163

USPC ......................................................... 152/504
See application file for complete search history.

(56) References Cited

U.S. PATENT DOCUMENTS

| | | |
|---|---|---|
| 3,419,516 A | 12/1968 | Tamo |
| 4,087,585 A | 5/1978 | Schulz |
| 4,754,013 A | 6/1988 | Antonen |
| 5,126,389 A | 6/1992 | Ona et al. |
| 5,194,649 A | 3/1993 | Okawa |
| 5,281,455 A | 1/1994 | Braun et al. |
| 5,300,171 A | 4/1994 | Braun et al. |
| 5,684,110 A | 11/1997 | Kawamura |
| 5,804,631 A | 9/1998 | Mine et al. |
| 5,840,794 A | 11/1998 | Palmer |
| 6,169,142 B1 | 1/2001 | Nakano et al. |
| 6,534,581 B1 | 3/2003 | Kleyer et al. |
| 6,593,413 B2 | 7/2003 | Muramatsu et al. |
| 6,642,309 B2 | 11/2003 | Komitsu et al. |
| 7,144,953 B2 | 12/2006 | Ueda et al. |
| 7,417,105 B2 | 8/2008 | Landon et al. |
| 7,893,170 B2 | 2/2011 | Wakioka et al. |
| 7,951,458 B2 | 5/2011 | Ogura et al. |
| 7,973,108 B2 | 7/2011 | Okamoto et al. |
| 3,030,371 A1 | 10/2011 | Chaussade |
| 8,231,944 B1 | 7/2012 | Schroeder |

(Continued)

FOREIGN PATENT DOCUMENTS

| | | |
|---|---|---|
| CN | 105440693 A | 3/2016 |
| EP | 0539234 A2 | 4/1993 |

(Continued)

OTHER PUBLICATIONS

International Search Report for related PCT Application No. PCT/EP2017/069744, dated Nov. 9, 2017, 3 pages.

(Continued)

*Primary Examiner* — Angela C Scott
(74) *Attorney, Agent, or Firm* — Warner Norcross + Judd LLP

(57) ABSTRACT

The present disclosure relates to self-sealing silicone sealant and/or gel compositions cured via a condensation cure chemistry and to their use subsequent to cure as puncture-resistant layers in any type of "inflatable" article, i.e. articles which take their functional shape after inflation with a suitable gas such as air. The present disclosure also relates to silicone materials, e.g. elastomers and/or gels obtained subsequent to curing said compositions designed to function as self-sealing tire puncture material, i.e. to seal puncture holes in the tread region of tires if/when punctured by a foreign body.

20 Claims, No Drawings

(56) References Cited

U.S. PATENT DOCUMENTS

| | | |
|---|---|---|
| 8,609,797 B2 | 12/2013 | Knepper et al. |
| 8,686,094 B2 | 4/2014 | Djurdjevic et al. |
| 8,785,537 B2 | 7/2014 | Carrard et al. |
| 8,801,890 B2 | 8/2014 | Verosky et al. |
| 9,493,689 B2 | 11/2016 | Stanjek et al. |
| 9,527,985 B2 | 12/2016 | Okamatsu |
| 9,732,203 B2 | 8/2017 | Okamatsu |
| 10,150,888 B2 | 12/2018 | Simon et al. |
| 10,414,907 B2 | 9/2019 | Takahara |
| 2002/0010251 A1 | 1/2002 | Muramatsu et al. |
| 2006/0194067 A1 | 8/2006 | Beger et al. |
| 2007/0173597 A1 | 7/2007 | Williams et al. |
| 2007/0237912 A1 | 10/2007 | Correia |
| 2007/0244249 A1 | 10/2007 | Correia |
| 2007/0282047 A1 | 12/2007 | Kimura et al. |
| 2011/0028646 A1 | 2/2011 | Sixt et al. |
| 2011/0248314 A1 | 10/2011 | Takei et al. |
| 2012/0022209 A1 | 1/2012 | Djurdjevic et al. |
| 2012/0123537 A1 | 5/2012 | Manesis et al. |
| 2013/0338289 A1 | 12/2013 | Jadot et al. |
| 2014/0235812 A1 | 8/2014 | Brandstadt et al. |
| 2014/0238471 A1 | 8/2014 | Wakita et al. |
| 2014/0256539 A1 | 9/2014 | Takei et al. |
| 2014/0350176 A1 | 11/2014 | Fisher et al. |
| 2015/0007938 A1 | 1/2015 | Stanjek et al. |
| 2015/0166859 A1 | 6/2015 | Choffat et al. |
| 2015/0183951 A1 | 7/2015 | Bhadwagar et al. |
| 2015/0315437 A1 | 11/2015 | Albaugh et al. |
| 2017/0002201 A1 | 1/2017 | Von Malotki et al. |
| 2018/0009951 A1 | 1/2018 | Gubbels et al. |
| 2019/0177486 A1 | 6/2019 | Baily et al. |
| 2019/0177584 A1* | 6/2019 | Gubbels .................. C08L 83/04 |
| 2019/0338077 A1 | 11/2019 | Chambard et al. |
| 2020/0140617 A1 | 5/2020 | Gubbels et al. |
| 2020/0190324 A1 | 6/2020 | Gubbels |

FOREIGN PATENT DOCUMENTS

| | | |
|---|---|---|
| EP | 2013289 B1 | 6/2016 |
| GB | 2424898 A | 10/2006 |
| JP | S5269460 A | 6/1977 |
| JP | S63172768 A | 7/1988 |
| JP | H0359174 A | 3/1991 |
| JP | H05194917 A | 8/1993 |
| JP | H05200935 A | 8/1993 |
| JP | H08269331 A | 10/1996 |
| JP | H08302193 A | 11/1996 |
| JP | 2001200161 A | 7/2001 |
| JP | 2006342327 A | 12/2006 |
| JP | 2007119695 A | 5/2007 |
| JP | 2010248446 A | 11/2010 |
| JP | 2011032473 A | 2/2011 |
| JP | 2011137119 A | 7/2011 |
| JP | 2012251058 A | 12/2012 |
| JP | 2013234245 A | 11/2013 |
| KR | 20110094109 A | 8/2011 |
| WO | 2001042365 A | 6/2001 |
| WO | 2001096463 A2 | 12/2001 |
| WO | 2005108499 A1 | 11/2005 |
| WO | 2007117552 A1 | 10/2007 |
| WO | 2008045395 A2 | 4/2008 |
| WO | 2009013309 A1 | 1/2009 |
| WO | 2010143357 A1 | 12/2010 |
| WO | 2013100175 A1 | 7/2013 |
| WO | 2014022377 A1 | 2/2014 |
| WO | 2015091396 A1 | 6/2015 |
| WO | 2016120270 A1 | 8/2016 |
| WO | 2017030128 A1 | 2/2017 |
| WO | 2017191322 A1 | 11/2017 |
| WO | 2018024856 A1 | 2/2018 |
| WO | 2018024857 A1 | 2/2018 |
| WO | 2018024858 A1 | 2/2018 |
| WO | 2018024860 A1 | 2/2018 |
| WO | 2018050503 A1 | 3/2018 |
| WO | 2018200796 A1 | 11/2018 |

OTHER PUBLICATIONS

International Preliminary Report on Patentability with Transmittal and Annex for related Application No. PCT/EP2017/069744, dated Jul. 10, 2018, 13 pages.

Noll, W., "Chemistry and Technology of Silicones," Academic Press Inc., New York, 1968, p. 397, 399.

Michael A. Brook, "Silicon in Organic, Organometallic and Polymer Chemistry," John Wiley & Sons, Inc., 2000, p. 285.

International Standard (ISO), "General methods of test for pigments and extenders—Part 2: Determination of matter volatile at 105C", 787-2, 1981.

International Search Report for Application No. PCT/EP2017/069753, dated Nov. 14, 2017, 3 pages.

International Preliminary Report on Patentability including Transmittal and Annex for Application No. PCT/EP2017/069753, dated Jun. 26, 2018, 14 pages.

Machine assisted English translation of JPS5269460A obtained from https://worldwide.espacenet.com on Nov. 18, 2019, 10 pages.

Machine assisted English translation of JP2001200161A obtained from https://patents.google.com on Nov. 18,2019, 7 pages.

Machine assisted English translation of JP2007119695A obtained from https://patents.google.com on Nov. 18, 2019, 11 pages.

Machine assisted English translation of WO2010143357A1 obtained from https://patents.google.com on Nov. 18, 2019, 26 pages.

Machine assisted English translation of JP2011137119A obtained from https://patents.google.com on Jan. 22, 2020, 11 pages.

Machine assisted English translation of JP2011137119A obtained from https://patents.google.com/patent on Apr. 7, 2020, 14 pages.

* cited by examiner

ELASTOMERIC COMPOSITIONS AND THEIR APPLICATIONS

CROSS-REFERENCE TO RELATED APPLICATIONS

This application is the National Stage of International Application No. PCT/EP2017/069744 filed on Aug. 03, 2017, which claims priority to and all advantages of Great Britain Patent Appl. No. 1613412.4 filed on Aug. 03, 2016, the content of which is hereby incorporated by reference.

The present disclosure generally relates to self-sealing silicone sealant and/or gel compositions cured via a condensation cure chemistry and to their use subsequent to cure as puncture-resistant layers in any type of "inflatable" article, i.e. articles which take their functional shape after inflation with a suitable gas such as air. The present disclosure also relates to silicone materials, e.g. elastomers and/or gels obtained subsequent to curing said compositions designed to function as self-sealing tire puncture material, i.e. to seal puncture holes in the tread region of tires if/when punctured by a foreign body.

Pneumatic tires are widely used due to their excellent shock absorbing property and ability to provide riding comfort in a vehicle. However, pneumatic tires are prone to puncture since they are inherently made of soft and flexible material including rubber. When a puncture occurs due to e.g. travelling over sharp foreign bodies such as nails, stones, glass fragments, the high pressure air inside the tire leaks causing deflation, and the pneumatic tire cannot function properly. Historically the sole solution when a tire was punctured by a foreign body e.g. a nail, was the laborious need to replace the original tire with a spare tire. However in recent years tire manufacturers have sought to provide alternative solutions for the driver, in particular the provision of self-sealing tires to allow a vehicle to continue to travel despite a considerable or complete loss of pressure in one or more tires. This makes it possible for example to drive to a breakdown point without having to stop, often in hazardous circumstances, to fit a spare tire.

Self-sealing compositions that allow such an objective to be achieved, and which by definition are capable of automatically ensuring that a tire is sealed in the event of a puncture thereof by a foreign body, such as a nail, are particularly difficult to develop.

Many solutions have been proposed but have not been overly successful in the provision of such a self-sealing tire puncture material for vehicle tires not least for reasons of lack of stability over time or lack of effectiveness under extreme operating temperature conditions, or else because of difficulties in manufacturing and/or using these self-sealing compositions.

To be usable, a self-sealing layer made upon cure of a composition must be effective over a very wide range of operating temperatures and to do so over the entire lifetime of the tire. It must be capable of closing off holes when the responsible puncturing object, which we call a "nail", remains in place. Upon expelling the nail, the self-sealing layer must be able to fill up the hole and make the tire airtight, especially under winter conditions. Key properties, namely tensile strength, elongation and cross-link density or the storage modulus have been identified in the industry as particular pertinent for the function of a self-sealing layer.

Tensile strength refers to the maximum stress (force per unit area) that a specimen of sealant material can withstand before rupturing. Elongation measures the relative increase in length of a specimen of material at the point of rupture. Cross-link density is a molecular property which measures the concentration of cross-links present in that part of the sealant which has been cured into a three dimensional cross-linked network. The storage modulus of a material is related to the cross link density of the material. A high crosslink density will lead to a higher storage modulus and conversely a low crosslinked material will exhibit a low storage modulus.

If the tensile strength of a sealant is too low, the sealant will flow under typical tire operating conditions and will also "blow through" a puncture hole when a puncturing object removed from the tire and fail to seal the hole. An acceptable sealant must therefore be formulated with sufficient tensile strength to withstand such a "blow through".

If the elongation of a sealant is too low, it will have several defects. When an object such as a nail enters a tire whose interior is coated with a sealant composition, the sealant should preferably adhere to the nail and form a tent-like structure surrounding it. Adhesion of the sealant to the nail at this time will assist in preserving an air barrier at the puncture and will also result in the sealant being drawn by the nail into the puncture hole as the nail is removed. If the sealant has insufficient elongation, it will be unable to stretch enough to form a tent. The sealant may then "cap" the nail, i.e., a small portion of sealant surrounding the tip of the nail will break away from the remainder of the sealant and remain adhered to the nail near its tip. Capping generally results in poor nail-in sealing performance. A further result of low elongation will be that in the case of a large puncture, not enough sealant will be able to flow over and into the hole to effect a seal when the puncturing object is removed.

The cross-link density of a polymeric sealant determines how strongly the sealant will resist permanent deformation. If the sealant has too high a cross-link density or storage modulus, it will be too resistant to permanent deformation, and the sealant will cap a puncturing object rather than form a tent, with the results described above. If the cross-link density or storage modulus is too low, centrifugal force will cause the sealant to creep or flow at elevated temperatures, resulting in insufficient sealant underlying the shoulder portion of the tire. Too low a cross-link density will also result in a low fatigue resistance for the sealant composition. Fatigue resistance is an important requirement for an effective tire sealant, most particularly in the situation where an object such as a nail enters a tire, and the tire is then used for a considerable time without the nail being removed. In a typical case, of course, a motorist will not even be aware of the nail's presence. Periodic contact between the punctured portion of the tire and the road will result in the nail flexing back and forth as the tire rotates. While the sealant may have formed a seal over or around the nail, the sealant itself will be continually stretched and relaxed, a process which over time will potentially cause the seal to fail and break the air seal.

Generally self-sealing tire solutions thus far have rarely utilised silicone materials. Typically silicone materials that form the gels and/or elastomers with fast cure speed are based on addition cure chemistry, or hydrosilylation, i.e. they are cured by the reaction of a silicon hydride group with onto an unsaturated carbon radical with the help of a catalyst, which is typically a platinum based compound.

Historically the industry has preferred hydrosilylation cure compositions of this type for these applications because they immediately cure in bulk i.e. throughout the body of the compound, resulting in a cured gel material in a matter of minutes whilst condensation cure systems are significantly slower, because they generally cure via a skin or diffusion process-curing from the sealant/air interface through the body of the gel composition/sealant with, for example, titanate cured condensation processes taking e.g. up to 7 days curing per 6 mm of depth of the body of the uncured material. Two part tin cured condensation systems do cure over a shorter period but they are not desired for e.g. electronics applications because undergo reversion (i.e. depolymerisation) at temperatures above 80° C. Moreover, tin based condensation cure compositions generate tough elastomers, which do not provide the required stress relief properties for electronic devices.

Whilst from a cure speed standpoint gels made from these hydrosilylation cure compositions are excellent there are several potential problems and/or disadvantages with the use of these types of products. Firstly they are generally cured at elevated temperature (i.e. temperatures significantly above room temperature). The hydrosilylation compositions can be contaminated and rendered uncurable due to inactivation of platinum based cure catalysts. The platinum catalysts are sensitive and may be poisoned by amine containing compounds, sulphur containing compounds and phosphorus containing compounds.

It is well known to people skilled in the art that alkoxy titanium compounds—i.e. alkyl titanates—are suitable catalysts for formulating one component moisture curable silicones (References: Noll, W.; Chemistry and Technology of Silicones, Academic Press Inc., New York, 1968, p. 399, Michael A. Brook, silicon in organic, organometallic and polymer chemistry, John Wiley & sons, Inc. (2000), p. 285). Titanate catalysts have been widely described for their use to formulate skin or diffusion cured one-part condensation curing silicone elastomers. These formulations are typically available in one-part packages that are applied in a layer that is thinner than typically 15 mm. Layers thicker than 15 mm are known to lead to uncured material in the depth of the material, because the moisture is very slow to diffuse in very deep sections. Skin or diffusion cure (e.g. moisture/condensation) takes place when the initial cure process takes place by the formation of a cured skin at the composition/air interface subsequent to the sealant/encapsulant being applied on to a substrate surface. Subsequent to the generation of the surface skin the cure speed is dependent on the speed of diffusion of moisture from the sealant/encapsulant interface with air to the inside (or core), and the diffusion of condensation reaction by-product/effluent from the inside (or core) to the outside (or surface) of the material and the gradual thickening of the cured skin over time from the outside/surface to the inside/core.

Multi component compositions designed to activate condensation cure in the bulk of the product do not use titanium based catalysts. They generally use other metal catalysts such as tin or zinc catalyst, e.g. dibutyl tin dilaurate, tin octoate and/or zinc octoate. (Noll, W.; Chemistry and Technology of Silicones, Academic Press Inc., New York, 1968, p. 397). In silicone compositions stored before use in two or more parts, one-part contains a filler which typically contains the moisture required to activate condensation cure in the bulk of the product. Unlike the previously mentioned diffusion cure one-part system, two-part condensation cure systems, once mixed together, enable bulk cure even in sections greater than 15 mm in depth. In this case the composition will cure (subsequent to mixing) throughout the material bulk. If a skin is formed, it will be only in the first minutes after application. Soon after, the product will become a solid in the entire mass. Titanate catalysts are not used for curing these types of two part compositions because it is well known that in the presence of a significant amount of moisture alkyl titanate catalysts will fully hydrolyse to form tetrahydroxy titanate, which is insoluble in silicone. This form of titanium loses its catalytic efficiency, leading to uncured systems.

In a first embodiment there is provided a two part moisture curing silicone tire sealant composition comprising
(i) at least one condensation curable silyl terminated polymer having at least one, typically at least two hydroxyl functional groups per molecule;
(ii) a cross-linker selected from the group of
    silanes having at least 2 hydrolysable groups, alternatively at least 3 hydrolysable groups per molecule group; and/or
    silyl functional molecules having at least 2 silyl groups, each silyl group containing at least one hydrolysable group, and
(iii) a condensation catalyst selected from the group of titanates and/or zirconates wherein (i), (ii) and (iii) are not stored together in a single part,
characterized in that the molar ratio of total silicon bonded hydroxyl (Si—OH) groups to total hydrolysable groups is between 0.5:1 and 2:1 using a silyl containing cross linker or 0.5:1 to 10:1, alternatively 0.5:1 to 4:1 using silyl functional molecules containing crosslinker and the molar ratio of catalyst M-OR functions to the sum of moisture present in the composition, as determined in accordance with ISO 787-2:1981, and total silicon bonded hydroxyl groups is between 0.01:1 and 0.6:1, where M is titanium or zirconium.

It is to be understood that for the sake of this application that "total hydrolysable groups" excludes both moisture and silicon bonded hydroxyl groups present in the composition.

The total silicon bonded hydroxyl (Si—OH) molar content is calculated for 100 g of the mixed formulation. The total silicon bonded hydroxyl molar content related to a polymer is equal to the amount in g of hydroxyl containing polymer in 100 g of the mixed product divided by the number average molecular weight (Mn) of the polymer multiply by the average number of hydroxyl functions present in the polymer, typically 2. If there are several hydroxyl functional polymers in the formulation, the sum of the molar content of each polymer is sum up to constitute the total silicon bonded hydroxyl (Si—OH) molar content in the formulation.

The number average molecular weight (Mn) and weight average molecular weight (Mw) of silicone can also be determined by Gel permeation chromatography (GPC). This technique is a standard technique, and yields values for Mw (weight average), Mn (number average) and polydispersity index (PI) (where PI=Mw/Mn).

Mn value provided in this application have been determined by GPC and represent a typical value of the polymer used. If not provided by GPC, the Mn may also be obtained from calculation based on the dynamic viscosity of said polymer. The catalyst M-OR value is =[(g of Titanate catalyst)*(number of OR in compound)] divided by the (molecular weight of Titanium catalyst).

The sealant material composition has a viscosity, when uncured, that permits the sealant material composition to be incorporated into a tire during a tire building process and a viscosity that, when cured, permits the material to flow into and seal a puncture in a tire. In one embodiment when the polymer (i) and cross-linker (ii) are mixed in the same part prior to mixing the viscosity of polymer (i) and cross-linker (ii) at 23° C. is equal or greater than 40,000 mPa·s as measured by a Brookfield cone plate viscometer RV DIII using the most appropriate cone plate for the viscosity of the composition.

There is also provided herein an inflatable article provided with a puncture-resistant layer comprising, as self-sealing composition, a two part moisture curing silicone tire sealant composition as hereinbefore described. In said two two part moisture curing silicone tire sealant composition, one part contains a filler which typically will contain the moisture required to activate the condensation cure in the bulk of the product. In the presence of such an amount of moisture, alkyltitanate catalysts would be fully hydrolysed to tetrahydroxy titanate, and as such the said filler and catalyst must be stored in different parts of the 2 part composition. Hence, the filler is generally always stored in a base with the condensation curable silyl terminated polymer (i). The two parts can be mixed in any suitable ratio, e.g. base part: catalyst package from 10:1 to 1:1, alternatively 5:1 to 1:1, preferably 1:1.

Polymer (i) is at least one a moisture/condensation curable silyl terminated polymer. Any suitable moisture/condensation curable silyl terminated polymer may be utilised including polydialkyl siloxanes, alkylphenyl siloxane, or organic based polymers with silyl terminal groups e.g. silyl polyethers, silyl acrylates and silyl terminated polyisobutylenes or copolymers of any of the above. Preferably the polymer is a polysiloxane based polymer containing at least one hydroxyl, most preferably the polymer comprises two terminal hydroxyl groups. Examples of suitable hydroxyl containing groups include $-Si(OH)_3$, $-(R^a)Si(OH)_2$, $-(R^a)_2Si(OH)$, or $-(R^a)_2Si-R^c-SiR^d_p(OH)_{3-p}$ where each $R^a$ independently represents a monovalent hydrocarbyl group, for example, an alkyl group, in particular having from 1 to 8 carbon atoms, (and is preferably methyl); each $R^d$ group is independently an alkyl group in which the alkyl groups suitably have up to 6 carbon atoms; $R^c$ is a divalent hydrocarbon group having up to 12 carbon atoms which may be interrupted by one or more siloxane spacers having up to six silicon atoms; and p has the value 0, 1 or 2.

Preferably polymer (i) has the general formula $$X^3\text{-A-}X^1 \qquad (1)$$

where $X^3$ and $X^1$ are independently selected from siloxane groups which terminate in hydroxyl containing groups and A is a siloxane and/or organic containing polymeric chain, alternatively a siloxane polymeric chain.

Examples of hydroxyl-terminating groups $X^3$ or $X^1$ include $-Si(OH)_3$, $-(R^a)Si(OH)_2$, $-(R^a)_2Si(OH)$, or $-(R^a)_2Si-R^c-Si(R^d)_p(OH)_{3-p}$ as defined above. Preferably the $X^3$ and/or $X^1$ terminal groups are hydroxydialkyl silyl groups, e.g. hydroxydimethyl silyl groups.

Examples of suitable siloxane groups in polymeric chain A of formula (I) are those which comprise a polydiorganosiloxane chain. Thus polymeric chain A preferably includes siloxane units of formula (2)

$$-(R^5_s SiO_{(4-s)/2})- \qquad (2)$$

in which each $R^5$ is independently an organic group such as a hydrocarbyl group having from 1 to 10 carbon atoms optionally substituted with one or more halogen group such as chlorine or fluorine and s is 0, 1 or 2, typically p is about 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl) ethyl or chlorocyclohexyl group. Suitably, at least some and preferably substantially all of the groups $R^5$ are methyl.

Typically the polymers of the above type will have a viscosity in the order of 1,000 to 300,000 mPa·s, alternatively 1,000 to 100,000 mPa·s at 23° C. measured by using a Brookfield cone plate viscometer (RV DIII) using the most appropriate cone plate for the viscosity concerned.

Preferred polysiloxanes containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

In accordance with the present invention polymeric chain A may alternatively be organic based polymers with silyl terminal groups e.g. silyl terminated polyethers, silyl terminated acrylates and silyl terminated polyisobutylenes. In the case of silyl terminated polyethers the polymer chain is based on polyoxyalkylene based units. Such polyoxyalkylene units preferably comprise a linear predominantly oxyalkylene polymer comprised of recurring oxyalkylene units, $(-C_nH_{2n}-O-)$ illustrated by the average formula $(-C_nH_{2n}-O-)_y$ wherein n is an integer from 2 to 4 inclusive and y is an integer of at least four. The number average molecular weight of each polyoxyalkylene polymer block or polymer may range from about 300 g/mol to about 10,000 g/mol, but can be higher. Moreover, the oxyalkylene units are not necessarily identical throughout the polyoxyalkylene monomer, but can differ from unit to unit. A polyoxyalkylene block, for example, can be comprised of oxyethylene units, $(-C_2H_4-O-)$; oxypropylene units $(-C_3H_6-O-)$; or oxybutylene units, $(-C_4H_8-O-)$; or mixtures thereof.

Other polyoxyalkylene units may include for example: units of the structure

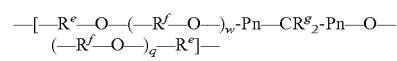
$$-[-R^e-O-(-R^f-O-)_w\text{-Pn}-CR^g_2\text{-Pn}-O- \\ (-R^f-O-)_q-R^e]-$$

in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is, a hydrogen atom or methyl group and each of the subscripts w and q is a positive integer in the range from 3 to 30.

For the purpose of this application "substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Crosslinkers (ii) that can be used are generally moisture curing
   silanes having at least 2 hydrolysable groups, alternatively at least 3 hydrolysable groups per molecule group; and/or
   silyl functional molecules having at least 2 silyl groups, each silyl group containing at least one hydrolysable group.

In some instances, the crosslinker (ii) having two hydrolysable groups may be considered a chain extender, i.e. when polymer (i) only has 1 or two reactive groups, but can be used to cross-link if polymer (i) has 3 or more reactive groups per molecule. The crosslinker (ii) may thus have two but alternatively has three or four silicon-bonded condensable (preferably hydroxyl and/or hydrolysable) groups per molecule which are reactive with the condensable groups in polymer (i).

For the sake of the disclosure herein silyl functional molecule is a silyl functional molecule containing two or more silyl groups, each silyl group containing at least one hydrolysable group. Hence, a disilyl functional molecule comprises two silicon atoms each having at least one hydrolysable group, where the silicon atoms are separated by an organic or siloxane spacer. Typically, the silyl groups on a disilyl functional molecule may be terminal groups. The spacer may be a polymeric chain.

For the sake of the disclosure herein a disilane is a silyl functional molecule having at least 2 silyl groups where the two silicon atoms are bonded to one another.

The hydrolysable groups on the silyl groups include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). In some instances, the hydrolysable group may include hydroxyl groups.

The silane cross-linker (ii) includes alkoxy functional silanes, oximosilanes, acetoxy silanes, acetonoxime silanes and/or enoxy silanes.

When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. The fourth silicon-bonded organic groups may be methyl.

A typical silane may be described by formula (3)

$$R''_{4-r}Si(OR^5)_r \quad (3)$$

wherein $R^5$ is described above and r has a value of 2, 3 or 4. Typical silanes are those wherein R" represents methyl, ethyl or vinyl or isobutyl. R" is an organic radical selected from linear and branched alkyls, allyls, phenyl and substituted phenyls, acethoxy, oxime. In some instances, $R^5$ represents methyl or ethyl and r is 3.

Another type of suitable crosslinkers (ii) are molecules of the type $Si(OR^5)_4$ where $R^5$ is as described above, alternatively propyl, ethyl or methyl. Partials condensates of $Si(OR^5)_4$ may also be considered.

In one embodiment the cross-linker (ii) is a silyl functional molecule having at least 2 silyl groups each having at least 1 and up to 3 hydrolysable groups, alternatively each silyl group has at least 2 hydrolysable groups.

The crosslinker (ii) may be a disilyl functional polymer, that is, a polymer containing two silyl groups, each containing at least one hydrolysable group such as described by the formula (4)

$$(R^4O)_m(Y^1)_{3-m}-Si(CH_2)_x-((NHCH_2CH_2)_t-Q(CH_2)_x)_n-Si(OR^4)_m(Y^1)_{3-m} \quad (4)$$

where $R^4$ is a $C_{1-10}$ alkyl group, $Y^1$ is an alkyl groups containing from 1 to 8 carbons, Q is a chemical group containing a heteroatom with a lone pair of electrons e.g. an amine, N-alkylamine or urea; each x is an integer of from 1 to 6, t is 0 or 1; each m is independently 1, 2 or 3 and n is 0 or 1.

The silyl (e.g. disilyl) functional crosslinker (ii) may have a siloxane or organic polymeric backbone. Suitable polymeric crosslinkers (ii) may have a similar polymeric backbone chemical structure to polymeric chain A as depicted in formula (1) above. In the case of such siloxane or organic based cross-linkers the molecular structure can be straight chained, branched, cyclic or macromolecular, i.e. a silicone or organic polymer chain bearing alkoxy functional end groups include polydimethylsiloxanes having at least one trialkoxy terminal where the alkoxy group may be a methoxy or ethoxy group. In the case of siloxane based polymers the viscosity of the cross-linker will be within the range of from 0.5 mPa·s to 80,000 mPa·s at 23° C. using a Brookfield cone plate viscometer (RV DIII) utilising a cone plate (measured in the same manner as polymer (i)). Whilst any of the hydrolysable groups mentioned above are suitable it is preferred that the hydrolysable groups are alkoxy groups and as such the terminal silyl groups may have the formula such as $-R^aSi(OR^b)_2$, $-Si(OR^b)_3$, $-R^a{}_2SiOR^b$ or $-(R^a)_2Si-R^c-SiR^d{}_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl group having up to 6 carbon atoms; $R^c$ is a divalent hydrocarbon group which may be interrupted by one or more siloxane spacers having up to six silicon atoms; and p has the value 0, 1 or 2. Typically each terminal silyl group will have 2 or 3 alkoxy groups.

Examples of disilyl polymeric crosslinkers (ii) with a silicone or organic polymer chain bearing alkoxy functional end groups include 1,6-bis (trimethoxysilyl)hexane (alternatively known as hexamethoxydisilylhexane HMSH), polydimethylsiloxanes having at least one trialkoxy terminal where the alkoxy group may be a methoxy or ethoxy group.

Crosslinkers (ii) thus include alkyltrialkoxysilanes such as methyltrimethoxysilane (MTM) and methyltriethoxysilane, tetraethoxysilane, partially condensed tetraethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyltris-methylethylketoximo)silane, methyltris(methylethylketoximino)silane, methyltris(isopropenoxy)silane, vinyltris (isopropenoxy)silane, ethylpolysilicate, n-propylorthosilicate, ethylorthosilicate, dimethyltetraacetoxydisiloxane, oximosilanes, acetoxy silanes, acetonoxime silanes, enoxy silanes and other such trifunctional alkoxysilanes as well as partial hydrolytic condensation products thereof; bis (trialkoxysilylalkyl)amines, bis (dialkoxyalkylsilylalkyl)amine, bis (trialkoxysilylalkyl)N-alkylamine, bis (dialkoxyalkylsilylalkyl)N-alkylamine, bis (trialkoxysilylalkyl)urea, bis (dialkoxyalkylsilylalkyl) urea, bis (3-trimethoxysilylpropyl)amine, bis (3-triethoxysilylpropyl)amine, bis (4-trimethoxysilylbutyl)amine, bis (4-triethoxysilylbutyl)amine, bis (3-trimethoxysilylpropyl)N-methylamine, bis (3-triethoxysilylpropyl)N-methylamine, bis (4-trimethoxysilylbutyl)N-methylamine, bis (4-triethoxysilylbutyl)N-methylamine, bis (3-trimethoxysilylpropyl) urea, bis (3-triethoxysilylpropyl)urea, bis (4-trimethoxysilylbutyl)urea, bis (4-triethoxysilylbutyl)urea, bis (3-dimethoxymethylsilylpropyl)amine, bis (3-diethoxymethyl silylpropyl)amine, bis (4-dimethoxymethylsilylbutyl) amine, bis (4-diethoxymethyl silylbutyl)amine, bis (3-dimethoxymethylsilylpropyl) N-methylamine, bis (3-diethoxymethyl silylpropyl) N-methylamine, bis (4-dimethoxymethylsilylbutyl) N-methylamine, bis (4-diethoxymethyl silylbutyl) N-methylamine, bis (3-dimethoxymethylsilylpropyl)urea, bis (3-diethoxymethyl silylpropyl)urea, bis (4-dimethoxymethylsilylbutyl)urea, bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine, bis (4-diethoxyethyl silylbutyl)amine, bis (3-dimethoxyethylsilylpropyl) N-methylamine, bis (3-diethoxyethyl silylpropyl) N-methylamine, bis (4-dimethoxyethylsilylbutyl) N-methylamine, bis (4-diethoxyethyl silylbutyl) N-methylamine, bis (3-dimethoxyethylsilylpropyl)urea bis (3-diethoxyethyl silylpropyl)urea, bis (4-dimethoxyethylsilylbutyl)urea and/or bis (4-diethoxyethyl silylbutyl)urea; bis (triethoxysilylpropyl) amine, bis (trimethoxysilylpropyl)amine, bis (trimethoxysilylpropyl)urea, bis (triethoxysilylpropyl)urea, bis (diethoxymethylsilylpropyl)N-methylamine; di or trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; di or triacetoxy silyl terminated polydialkyl; polyarylalkyl siloxane; di or trioximino silyl terminated polydialkyl; polyarylalkyl siloxane; di or triacetonoxy terminated polydialkyl or polyarylalkyl. The cross-linker (ii) used may also comprise any combination of two or more of the above.

The molar ratio of total silicon bonded hydroxyl groups to total hydrolysable groups is between 0.4:1 and 2:1 using a mono silyl containing cross linker or 0.5:1 to 4:1 using disilyl containing crosslinker. In one alternative the molar ratio of total silicon bonded hydroxyl groups to total hydrolysable groups is between 1:1 and 2:1.

The total hydrolysable groups molar content is calculated for 100 g of the mixed formulation. The molar content of hydrolysable groups related to a substance is equal to the amount in g of the molecule that contains the hydrolysable groups in 100 g of the mixed product divided by the molecular weight of the molecule or the number average molecular weight (Mn) in case it is a polymeric molecule multiply by the average number of hydrolysable functions present in the molecule. The sum of the molar content of each molecule or polymer is sum up to constitute the total molar content of hydrolysable groups in the formulation.

The molar ratio of total silicon bonded hydroxyl groups to total hydrolysable groups is then calculated by dividing the total molar content of total silicon bonded hydroxyl (Si—OH) groups by the total molar content of hydrolysable groups or can be depicted as a ratio.

The composition further comprises a condensation catalyst. This increases the speed at which the composition cures. The catalyst chosen for inclusion in a particular silicone sealant composition depends upon the speed of cure required.

Titanate and/or zirconate based catalysts may comprise a compound according to the general formula $Ti[OR^{22}]_4$ or $Zr[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate and/or zirconate may contain partially unsaturated groups. Examples of $R^{22}$ include but are not restricted to methyl, ethyl, propyl, isopropyl, butyl, tertiary butyl and a branched secondary alkyl group such as 2, 4-dimethyl-3-pentyl. Alternatively, when each $R^{22}$ is the same, $R^{22}$ is an isopropyl, branched secondary alkyl group or a tertiary alkyl group, in particular, tertiary butyl. Suitable titanate examples include tetra n-butyl titanate, tetra t-butyl titanate, titanium tetrabutoxide and tetraisopropyl titanate. Suitable zirconate examples include tetra-n-propyl zirconate, tetra-n-butyl zirconate and zirconium diethylcitrate.

Alternatively, the titanate and/or zirconate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate or diisopropyldiethylacetoacetate titanate.

The molar ratio of catalyst M-OR functions to the sum of moisture present in the composition, as determined in accordance with ISO 787-2:1981 and total silicon bonded hydroxyl groups is between 0.01:1 and 0.6:1, where M is titanium or zirconium.

The composition as hereinbefore described is typically made from the condensation curable gel or elastomer composition which is stored in a 2 part manner. The two part compositions may be mixed using any appropriate standard two-part mixing equipment with a dynamic or static mixer and is optionally dispensed therefrom for use in the application for which it is intended.

In one embodiment, the two part moisture curing silicone tire sealant composition is stored in two parts where said parts may be divided as follows
a) polymer(i) and cross-linker (ii) in one part and polymer (i) and catalyst (iii) in the other part;
b) cross-linker (ii) in one part and polymer (i) and catalyst (iii) in the other part or
c) when more than one polymer (i) is being utilised a first polymer (i) and cross-linker (ii) in one part and a second polymer (i) and catalyst (iii) in the other part;
d) polymer (i) in one part and the cross-linker (ii) and catalyst (iii) in the other part.

In each case the filler and catalyst are not in the same part. Typically, when present, filler is mixed with polymer (i) in a base part which may also contain other additives.

The two parts can be mixed in any suitable ratio, e.g. base part:catalyst package for example from 15:1 to 1:1, alternatively 10:1 to 1:1, alternatively 5:1 to 1:1, preferably 1:1.

Other than the above components optional components may be blended in the composition within a range such that the object of the present invention is achieved.

Examples of optional components include fillers, heat resistance-imparting agents, cold resistance-imparting agents, flame retarders, thixotropy-imparting agents, pigments, surfactants, flux agents, acid acceptors, protection agents, UV stabilizers, antioxidants, antiozonants, anti-corrosion additives, dyes and any suitable combination thereof.
Fillers The two part moisture curing silicone tire sealant composition may incorporate fillers, for example reinforcing and/or non reinforcing inorganic fillers, thermally and/or electrically conductive fillers e.g. metallic fillers and meltable fillers, or a combination thereof.

Examples of finely divided, reinforcing fillers include high surface area fumed and precipitated silicas including rice hull ash and to a degree calcium carbonate. Examples of additional finely divided non-reinforcing fillers include crushed quartz, diatomaceous earths, barium sulphate, iron oxide, titanium dioxide, carbon black, glass beads, hollow glass beads, talc, wollastonite. Other fillers which might be used alone or in addition to the above include carbon nanotubes, e.g. multiwall carbon nanotubes, carbon fibres, aluminite, calcium sulphate (anhydrite), gypsum, calcium sulphate, barium titanate, magnesium carbonate, clays such as kaolin, aluminium trihydroxide, magnesium hydroxide (brucite), graphite, diamond, copper carbonate, e.g. malachite, nickel carbonate, e.g. zarachite, barium carbonate, e.g. witherite and/or strontium carbonate e.g. strontianite. Examples of anhydrous inorganic fillers include onyx; aluminium trihydrate, metal oxides such as aluminium oxide, beryllium oxide, magnesium oxide, zinc oxide; nitrides such as aluminium nitride and boron nitride; carbides such as silicon carbide and tungsten carbide; and combinations thereof.

Further examples of fillers include aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3 \cdot 2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$. The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

Any combination of two or more of the above fillers may be used.

When present in a preferred embodiment the fillers utilised are selected from fumed and precipitated silicas, calcium carbonate, carbon black, hollow glass beads and/or carbon nanotubes, e.g. multiwall carbon nanotubes, and mixtures thereof.

Filler Treating Agent

The thermally conductive filler and/or the anhydrous reinforcing and/or extending filler if present, may optionally be surface treated with a treating agent. Treating agents and treating methods are known in the art, The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally the surface treatment renders the filler(s) hydrophobic and therefore easier to handle and obtain a homogeneous mixture with the other components in the composition. Silanes such as

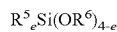

wherein $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, with the alkyl groups of 6 to 20 carbon atoms being preferred., $R^6$ is an alkyl group of 1 to 6 carbon atoms, and letter e is equal to 1, 2 or 3 may also be utilised as the treating agent for fillers.

Adhesion Promoter

Suitable adhesion promoters may comprise alkoxysilanes of the formula $R^{14}{}_hSi(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. Examples of adhesion promoters may be found in U.S. Pat. Nos. 4,087,585 and 5,194,649. The curable composition may comprise, when present, 0.01% to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Surfactants

Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05% of the surfactant based on the weight of the composition.

Flux Agent

The composition may comprise up to 2% of a flux agent based on the weight of the composition. Molecules containing chemically active functional groups such as carboxylic acid and amines can be used as flux agents. Such flux agents can include aliphatic acids such as succinic acid, abietic acid, oleic acid, and adipic acid; aromatic acids such as benzoic acids; aliphatic amines and their derivatives, such as triethanolamine, hydrochloride salts of amines, and hydrobromide salts of amines. Flux agents are known in the art and are commercially available.

Acid Acceptor

Suitable acid acceptors include magnesium oxide, calcium oxide, and combinations thereof. The composition may comprise up to 2% of acid acceptor based on the weight of the composition, if appropriate.

Anti corrosion additives, such as nitrogen/sulphur containing heterocyclic compounds containing a triazole structure, a thiadiazole structure, a benzotriazole structure, a mercaptothiozole structure, a mercaptobenzothiazole structure or a benzimidazole structure.

This invention relates to a two part moisture curing silicone tire sealant composition for use in pneumatic tires, such as tires with or without inner tubes, such as automobile and truck tires, capable of providing pneumatic sealing properties to the tires for the protection of carcass punctures in originals tires as well as in retreaded tires.

In one embodiment there is provided a self-sealing pneumatic rubber tire with a sealing band adheringly attached in the circumferential direction on the inner side of the tire, radially within the tread, with the sealant comprising cured two part moisture curing silicone tire sealant composition as herein before described applied on the inner side of the tire.

The invention also relates to a method for producing a self-sealing tire using a sealing band with a sealant applied on a carrier material, which sealing band is introduced into the tire and applied on the inner wall surface of the tire, running between the shoulder regions.

In a preferred embodiment of the invention, there is provided a pneumatic tire comprising an outer circumferential tread, a supporting carcass therefore and an inner rubber liner disposed inwardly from the supporting carcass, and a sealant material composition layer which is disposed between the carcass and the inner liner comprises the sealant material composition according to the present invention.

Alternatively there is provided a self-sealing pneumatic rubber tire wherein the tire has sidewalls, a supporting carcass, inextensible beads, an inner liner (air barrier layer), a sealant layer, and an outer circumferential tread (tread portion). The individual sidewalls extend radially inward from the axial outer edges of the tread portion to join the respective inextensible beads. The supporting carcass can act as a supporting structure for the tread portion and sidewalls. The sealant material composition layer can be disposed between the supporting carcass and the inner liner. The outer circumferential tread is adapted to be ground-contacting when the tire is in use.

In order for a sealant to be practical as a self-sealing layer for a tire, it must also be formulated so that it can be easily and practically applied to the tire or article on which it is to be used. One method of applying sealant to the interior of a tire includes the steps of mixing the sealant composition with a curing agent and spraying it into the tire interior as the tire is rotated. Some curing of the sealant occurs as the tire is rotated due to the mixing of the two parts of the composition, resulting in a uniform, seamless coating which resists running and pooling.

The composition as herein described is typically suited for application onto a post-vulcanised tire as no heat is required for curing.

In the present invention the two part composition is mixed in a suitable mixing/dosing unit and the mixed composition is immediately applied onto the target substrate (tire) surface. Post mixing the composition is designed to have sufficient green strength to adhere to the tire inner surface and will cure after several hours.

Typically the two part moisture curing silicone tire sealant composition is applied in an uncured state and cures upon mixing and deposition on the substrate tire surface so as to have a cured thickness of between 0.25 and 10 mm, alternatively between 0.5 mm and 10 mm, alternatively between 1 and 5 mm, depending on the end use as discussed below. Subsequent to intermixing but prior to cure the condensation curable gel composition may be applied on to a substrate using a suitable dispenser such as for example curtain coaters, spray devices die coaters, dip coaters, extrusion coaters, knife coaters and screen coaters which upon cure formation is provides a coating on said substrate.

The thickness and pressure requirements required will vary depending on the end use of the tire concerned. Thus, for example, for tires of passenger vehicle type, it can have a thickness of at least 0.5 mm, preferably between 1 and 5 mm. According to another example, for tires for heavy duty or agricultural vehicles, the preferred thickness can lie between 1 and 6 mm. According to another example, for tires for vehicles in the field of earthmoving equipment or for aircraft, the preferred thickness can lie between 2 and 10 mm. Finally, according to another example, for bicycle tires, the preferred thickness can lie between 0.4 and 2 mm.

The cured material derived from the two part moisture curing silicone tire sealant composition described above is a tacky solid (at 23° C.) and is characterized in particular, thanks to its specific formulation, by a very high flexibility and deformability. One advantage of use of the composition as described herein is that the cured layer has the advantage of exhibiting, within a very wide range of operating temperatures for the tires, virtually no disadvantage in terms of rolling resistance in comparison with a tire not comprising a self-sealing layer. In comparison with non-silicone self-sealing compositions, the risks of excessive creep during use at relatively high temperature (typically greater than 60° C.), a temperature frequently encountered during the use of some tires, are notably reduced as silicone based materials are more resistant to extreme temperature changes than many organic alternatives. Its self-sealing properties are also improved during use at low temperature (typically less than 0° C.).

Furthermore, the cured material derived from the aforementioned composition has a storage modulus of between 9,000 and 26,000 Pa. A storage modulus comprised between these two values has been identified to provide the right balance between softness (tackiness to the nail or itself) and hardness (creep/flow resistance under pressure). A silicone formulation exhibiting such a storage modulus at 23° C. will exhibit a storage modulus at other temperatures, i.e. from −25 to 100° C., which still is compliant with the required balance of modulus to act as a self-sealing coating for tires.

If a foreign body, such as a nail, passes through the structure of the tire, the composition serving as self-sealing layer is subjected to several stresses. In reaction to these stresses, and thanks to its advantageous deformability and elasticity properties, said composition creates an impermeable contact zone around the body. It does not matter whether the contour or the profile of said body is uniform or regular, the flexibility of the self-sealing composition enables it to be insinuated into openings of very small size. This interaction between the self-sealing composition and the foreign body seals the zone affected by said body.

In the event of the foreign body being removed, whether accidentally or intentionally, a perforation remains, this being liable to create a relatively large leak, depending on its size. The self-sealing composition, exposed to the hydrostatic pressure, is sufficiently soft and deformable to seal off, by being deformed, the perforation, preventing the inflation gas from leaking. In particular in the case of a tire, it has been shown that the flexibility of the self-sealing composition enables the forces of the surrounding walls to be withstood without any problems, even during phases in which the loaded tire deforms when running/rolling.

Whilst the above description has largely concentrated on the use of the composition with tires, it should be understood that the cured material resulting from the previously described composition may be used as a puncture-resistant layer in any type of "inflatable" article, that is to say, by definition, any article that takes its useable form when inflated with air. Examples of such inflatable articles include for the sake of example (but are not restricted to) inflatable boats and balloons or balls used for games or sport. The two part composition as described would be applied onto an internal wall of the inflatable article, completely or at least partly covering it.

The composition as described above, upon cure, is particularly well suited to use as a puncture-resistant layer in a tire for a vehicles of the passenger type, SUVs (Sport Utility Vehicles), two-wheel vehicles (especially bicycles and motorcycles), aircraft, or industrial vehicles chosen from vans, "heavy" vehicles, i.e. underground trains, buses, road transport vehicles (lorries, tractors, trailers), off-road vehicles, such as agricultural or civil engineering machines, and other transport or handling vehicles. It would have no issues with tires for passenger vehicles capable of running at very high speed or tires for industrial vehicles, such as heavy duty vehicles, capable of running/rolling and operating under particularly high internal temperature conditions.

EXAMPLES

All viscosity measurements were made Brookfield cone plate viscometer RV DIII using the most appropriate cone plate at 23° C. unless otherwise indicated.

For the benefit of the examples the following commercially available tires were purchased and utilized:
Bridgestone Turanza ER300 205/55/16 91 H,
Continental Conti Premium Contact 5 205/55/16 91W,
Goodyear Efficient Grip 205/55/16 91H,
Michelin Energy Saver 205/55/16 91V, and
Pirelli Cinturato P7 205/55/16 91V.

Preparation of Base A 73.01 g of Nanocyl® NC 7000 carbon nanotubes, 3544.2 g of OH terminated polydimethylsiloxane exhibiting a viscosity of ca 50,000 mPa·s and an number average molecular weight (Mn) of 63,000 g/mol and 382.8 g of Trimethoxysilyl terminated polydimethylsiloxane exhibiting a viscosity of ca 56,000 mPa·s and an number average molecular weight (Mn) of 62,000 g/mol were added in a Neulinger 5 liter mixer. They were initially mixed for 2 minutes using a planetary mixer at 50 rpm, then for a further 15 minutes using the planetary mixer at 50 rpm and the disk at 700 rpm and finally for a further 30 minutes using the planetary mixer at 100 rpm and the disk at 700 rpm. The resulting base product was then unloaded into a pail.

Preparation of Base B 1500 g of Evonik Printex A carbon black, 8825 g of OH terminated polydimethylsiloxane exhibiting a viscosity of ca 50,000 mPa·s and an number average molecular weight (Mn) of 63,000 g/mol and 973 g of Trimethoxysilyl terminated polydimethylsiloxane exhibiting a viscosity of ca 56,000 mPa·s and an number average molecular weight (Mn) of 62,000 g/mol were added in a 20 liter pail and was mixed 60 minutes with a Collomix Biax pail mixer.

Preparation of the Mixtures

Example 1

24.87 g of Trimethoxysilyl terminated polydimethylsiloxane having a viscosity of ca 56,000 mPa·s and an number average molecular weight (Mn) of 62,000 g/mol and 0.133 g of tetra n-butyl titanate were mixed together with a dental mixer at 2300 rpm for 30 seconds. 250 g of base A was introduced into a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Example 2

28.85 g of Trimethoxysilyl terminated polydimethylsiloxane having a viscosity of ca 56,000 mPa·s and an number average molecular weight (Mn) of 62,000 g/mol and 0.155 g of tetra n-butyl titanate were mixed together with a dental mixer at 2300 rpm for 30 seconds. 290 g of base 2 was introduced into a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Comparative Example 1

40.85 g of trimethoxysilyl terminated polydimethylsiloxane exhibiting a viscosity of ca 56,000 mPa·s and an number average molecular weight (Mn) of 62,000 g/mol was pre-mixed with 0.133 g of tetra n-butyl titanate. 250 g of the base A was added into a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Comparative Example 2

15.89 g of trimethoxysilyl terminated polydimethylsiloxane exhibiting a viscosity of ca 56,000 mPa·s and an number average molecular weight (Mn) of 62,000 g/mol was pre-mixed with 0.133 g of tetra n-butyl titanate. 250 g of base A was added in a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Tabulated details of the compositions of Example 1 and Comparative examples 1 and 2 tested are provided in Table 1. The results of the test on the tires as run below are depicted in Table 2.

Evaluation of Hardness and Storage Modulus

A TA XT plus texture analyzer was used to monitor the hardness of the cured elastomer. The probe used is a polycarbonate cylinder terminated by a spherical end. The diameter of the probe and sphere is ½ inch (1.27 cm). A return to start program was used. The pretest speed is 5 mm/s and the trigger force is 0.1 g. The test speed is 1 mm/s. the probe is inserted to a distance of 5 mm in the product and then removed to a distance where no significant force is measured. The maximum positive and negative force is measured and reported here. A higher positive force is representative of a harder elastomer. A higher negative force is representative of a more tacky elastomer Evaluation of Sealing Efficiency Holes of 3 mm diameter were cut on the rolling band of the tires with the help of a press and a cutting cylinder. The resulting product of Example 1, 2 and Comparative examples 1 and 2 were respectively filled into 310 ml cartridges and applied onto the inside of the tires and smoothed with a ruler at the designed thickness.

The products of Example 1, 2 and Comparative examples 1 and 2 were applied at the desired thickness to cover 3 holes in the tire without filling them. After 7 days of cure at 23° C. and 50% relative humidity the tires were mounted on wheels and pressurized at 1 bar (0.1 MPa). Nails of 5 mm diameter were pushed in the 3 mm holes to a distance of 40 mm inside the tire. The pressure was then increased to 2.7 bars (0.27 MPa) and the holes were removed from the tire.

In the following hours and days the leaking holes were filled with string repair plugs without cement, until no more leaks were observed, using optionally water to track leaks. The tires were kept for two weeks after repair. Results after 14 days without a loss of more than 0.1 bar (0.01 MPa) are reported in table 2. A 3/3 means that no leakage were observed on any of the 3 holes. 0/3 means that all three holes had to be repaired since they leaked.

TABLE 1

Compositions

| Weight parts | Example 1 | Example 2 | Comparative example 1 | Comparative example 2 |
|---|---|---|---|---|
| Part 1 - Base | | | | |
| OH terminated polydimethylsiloxane (viscosity ca 50,000 mPa · s) | 100 | 100 | 100 | 100 |
| Nanocyl NC 7000 carbon nanotubes | 2.06 | | 2.06 | 2.06 |
| Printex A carbon black | | 17 | | |
| Trimethoxysilyl terminated polydimethylsiloxane (viscosity ca 56,000 mPa · s) | 10.8 | 10.8 | 10.8 | 10.8 |
| Part 2 - Crosslinker and catalyst | | | | |
| Trimethoxysilyl terminated polydimethylsiloxane (viscosity ca 56,000 mPa · s) | 11.2 | 11.2 | 18.36 | 7.2 |
| tetra n-butyl titanate | 0.06 | 0.06 | 0.06 | 0.06 |
| SiOH/SiOR mol content | 1.46 | 1.37 | 1.10 | 1.79 |
| Xlinker content (mmol/100 g) | 0.29 | 0.26 | 0.36 | 0.24 |

TABLE 2

Evaluation results

| | Example 1 | Example 2 | Comparative example 1 | Comparative example 2 |
|---|---|---|---|---|
| Tire (5 mm thick coating) | Tightness of punctures after 2 weeks at 2.7 bars (0.27 MPa) | | | |
| Bridgestone | 3/3 | 3/3 | 3/3 | 2/3 |
| Continental | 3/3 | 3/3 | 0/3 | 0/3 |
| Goodyear | 3/3 | 3/3 | 1/3 | 1/3 |
| Michelin | 3/3 | 3/3 | 2/3 | 2/3 |
| Pirelli | 3/3 | 3/3 | 3/3 | 3/3 |
| Tire (3 mm thick coating) | Tightness of punctures after 2 weeks at 2.7 bars (0.27 MPa) | | | |
| Bridgestone | 2/3 | 3/3 | 2/3 | 1/3 |
| Continental | 3/3 | 3/3 | 0/3 | 0/3 |
| Goodyear | 3/3 | 3/3 | 2/3 | 0/3 |
| Michelin | 3/3 | 0/3 | 0/3 | 1/3 |
| Pirelli | 2/3 | 3/3 | 1/3 | 0/3 |
| Texture analyzer | | | | |
| F+ (g) | 210 | 217 | 290 | 138 |
| F− (g) | 100 | 93 | 33 | 77 |

Example 1 is showing excellent results for tightness, while Comparative examples 1 and 2 are showing numerous failures in the test. This shows that an appropriate crosslink density is required to obtain a product that will seal tires.

Texture analyzer results of the examples indicate that a compromise in hardness and tackiness has to be achieved for an appropriate performance in the tire. A too rigid material (Comparative example 1) will not exhibit enough tackiness to be able to close the gap definitely, while a too soft material (Comparative example 2) will not exhibit enough hardness to prevent creep of the material out of the hole. Example 1 and 2 exhibit an appropriate balance of hardness and tackiness to close the gap caused by the nail without exhibiting creep.

Rheology measurements on Example 1 and Comparative examples 1 and 2 indicate that a temperature range of from −20 to 80° C. has a very limited impact on the storage modulus of the product. This range of temperature is typical of temperature extremes a tire may need to endure during its lifetime in use. This highlights the potential advantage of the silicone technology as a tire sealant over other organic alternatives, which exhibit typically a much higher variation in rheology measurements over this temperature range.

The invention claimed is:
1. A multi-part self-sealing moisture curing silicone sealant composition comprising:
    (i) at least one condensation curable silyl terminated polymer having at least one, optionally at least 2 hydroxyl functional groups per molecule;
    (ii) a cross-linker selected from the group consisting of;
    silanes having at least 2 hydrolysable groups, optionally at least 3 hydrolysable groups per molecule, and/or
    silyl functional molecules having at least 2 silyl groups, each silyl group containing at least one hydrolysable group;
    (iii) a condensation catalyst selected from the group consisting of titanates and/or zirconates; and
    (iv) a filler;
    wherein polymer (i), cross-linker (ii) and condensation catalyst (iii) are not stored together in a single part; and
    wherein the molar ratio of total silicon-bonded hydroxyl groups to total hydrolysable groups is between 0.5:1 and 2:1 using a silane containing cross-linker (ii) or 0.5:1 to 10:1 using a silyl functional molecule containing cross-linker (ii) and the molar ratio of condensation catalyst (iii) M-OR functions to the sum of moisture present in the composition, as determined in accordance with ISO 787-2:1981, and total silicon-bonded hydroxyl groups is between 0.01:1 and 0.6:1, where M is titanium or zirconium and R is an aliphatic hydrocarbon group.
2. The multi-part self-sealing moisture curing silicone sealant composition in accordance with claim 1, wherein the viscosity of the polymer (i) and the cross-linker (ii) when mixed at 23° C. is at least 40,000 mPa·s.
3. The multi-part self-sealing moisture curing silicone sealant composition in accordance with claim 1, wherein the filler (iv) is selected from the group consisting of fumed and precipitated silicas, calcium carbonate, carbon black, hollow glass beads and/or carbon nanotubes.
4. The multi-part self-sealing moisture curing silicone sealant composition in accordance with claim 3, wherein the filler (iv) is multiwall carbon nanotubes and/or is carbon black.
5. The multi-part self-sealing moisture curing silicone sealant composition in accordance with claim 1, wherein the molar ratio of total silicon-bonded hydroxyl groups to total hydrolysable groups is between 1:1 and 2:1.
6. The multi-part self-sealing moisture curing silicone sealant composition in accordance with claim 1, wherein the composition is stored in two parts, a base part comprising polymer (i) and filler (iv), and a curing part comprising cross-linker (ii) and condensation catalyst (iii).
7. The multi-part self-sealing moisture curing silicone sealant composition in accordance with claim 1, wherein polymer (i) has at least 2 hydroxyl functional groups per molecule.
8. The multi-part self-sealing moisture curing silicone sealant composition in accordance with claim 1, wherein cross-linker (ii) is selected from the group consisting of silanes having at least 3 hydrolysable groups per molecule.

9. The multi-part self-sealing moisture curing silicone sealant composition in accordance with claim 1, wherein the filler (iv) contains moisture.

10. The multi-part self-sealing moisture curing silicone sealant composition in accordance with claim 1, wherein the condensation catalyst (iii) comprises a titanate.

11. The multi-part self-sealing moisture curing silicone sealant composition in accordance with claim 10, wherein the titanate is of the general formula $Ti[OR]_4$ where R is an aliphatic hydrocarbon group.

12. A moisture cured self-sealing silicone sealant for an inflatable article comprising the condensation reaction product of the multi-part self-sealing moisture curing silicone sealant composition in accordance with claim 1.

13. A self-sealing inflatable article comprising the moisture cured self-sealing silicone sealant in accordance with claim 12.

14. The self-sealing inflatable article in accordance with claim 13 which is in the form of a tire.

15. The self-sealing inflatable article in accordance with claim 14 comprising:

a) a tire body that is made of flexible and airtight material and is adapted to be assembled with a rim; and
   b) the moisture cured self-sealing silicone sealant adapted to seal a puncture in the tire body.

16. The self-sealing inflatable article in accordance with claim 13 having a puncture-resistant layer, wherein the puncture-resistant layer is a layer of the moisture cured self-sealing silicone sealant.

17. The self-sealing inflatable article according to claim 16, wherein the puncture-resistant layer has a thickness of greater than 0.3 mm.

18. The self-sealing inflatable article according to claim 17, wherein the puncture-resistant layer has a thickness of between 0.5 mm and 10 mm.

19. The self-sealing inflatable article according to claim 16, wherein the puncture-resistant layer is positioned on an internal wall of the inflatable article.

20. A self-sealing tire comprising the condensation reaction product of the multi-part self-sealing moisture curing silicone sealant composition in accordance with claim 1.

* * * * *